Patented Feb. 20, 1951

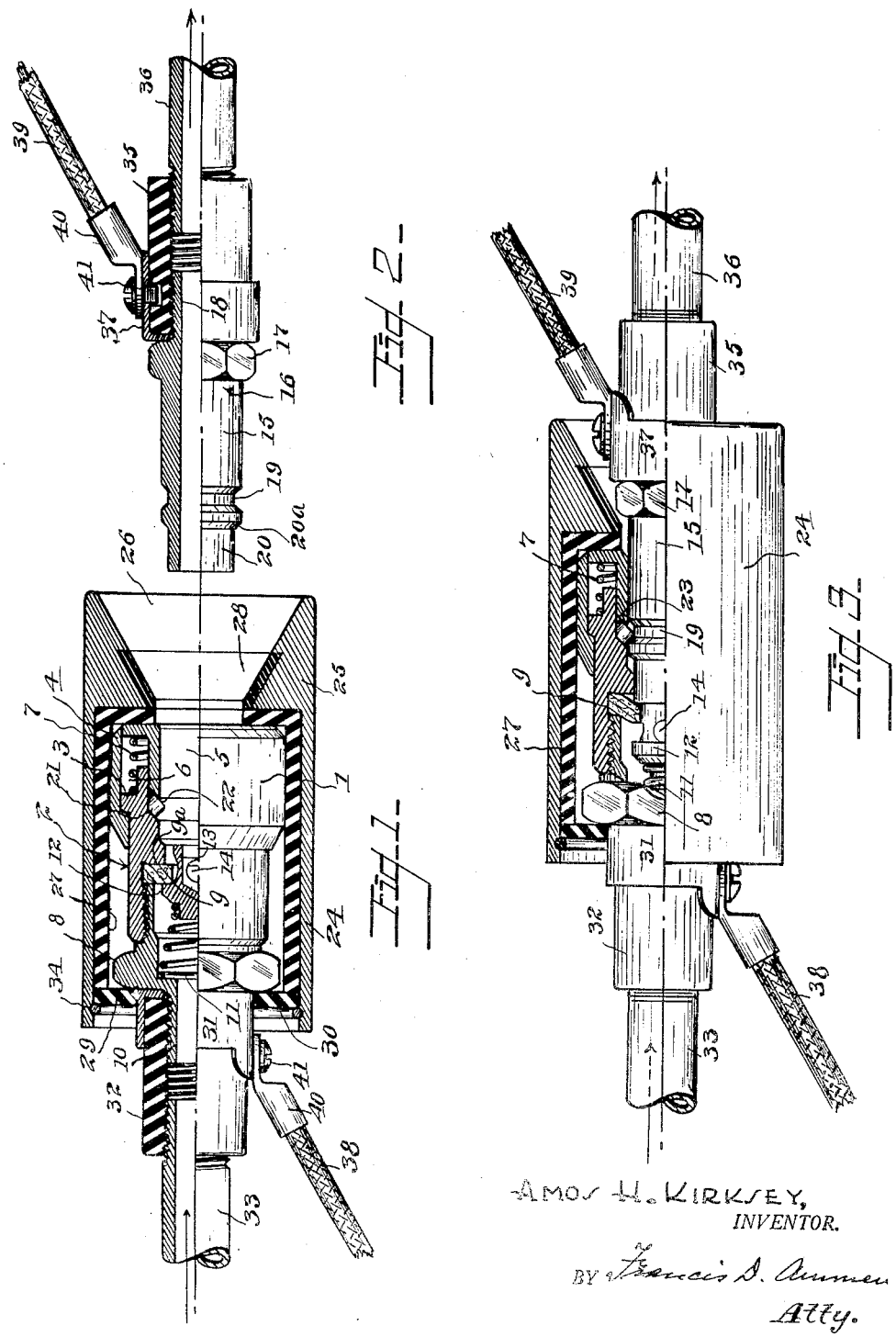

2,542,536

UNITED STATES PATENT OFFICE 2,542,536

COMBINED PIPE AND ELECTRIC COUPLING

Amos H. Kirksey, Vernon, Calif.

Application August 6, 1945, Serial No. 609,059

10 Claims. (Cl. 174—21)

1

This invention relates to couplings and particularly to couplings adapted to connect up pipe lines or hose lines.

While the invention is capable of application to any kind of hose—or pipe—coupling, it is intended to be especially useful when applied to the couplings that are employed for connecting compressed air lines or hydraulic lines from a towing vehicle to a trailer or semi-trailer. Such trailers of semi-trailers carry lights and it is now the usual practice to provide hose couplings for the fluid (air or liquid) that operates the trailer brakes, and separate electric couplings for closing the light circuit to the lamps on the trailer.

It is common practice to back the towing vehicle into position in front of the trailer, so as to couple the same to the semi-trailer through a specially constructed fifth wheel and king-pin. One of the objects of this invention is to produce a combined pipe—or hose—coupling and an electric coupling, that is to say, to provide a unitary coupling that functions as a pipe coupling and also as an electric coupling.

Another object of the invention is to provide a unitary coupling capable of performing the double function referred to above, which is so constructed as to enable me to employ a commercial pipe or hose coupling now in the market by using additional parts that I employ for enabling the pipe coupling members to carry the electric current, at the same time providing for proper insulation of the coupling to insure its safety in operation.

Another object of the invention is to provide means for facilitating the guiding of the coupling members into their coupled relation when the towing vehicle is backed into the semi-trailer to be coupled up to the same.

Further objects of the invention will appear hereinafter.

The invention consists in the novel parts and combination of parts all of which cooperate to produce an efficient combined pipe coupling and electric coupling.

A preferred embodiment of the invention is described in the following specification, while the broad scope of the invention is pointed out in the appended claims.

In the drawing:

Figure 1 is a view showing the upper half of one of the coupling members and contiguous parts in longitudinal section on its longitudinal axis and showing a portion of the lower half of the same in elevation, with its shell or casing in section.

2

Figure 2 is a half elevation and half section of the other coupling member and contiguous parts.

Figure 3 is a half elevation and half section showing the coupling closed or in its telescoped relation.

Referring more particularly to the parts, in Figure 1, they include a pipe-coupling member 1 which in the present instance comprises a body 2 of substantially cylindrical form with an integral collar 3 located toward its inner end, and over this collar is telescoped an outer sleeve 4.

In the inner end of the bore of this sleeve 4 is received an inner sleeve 5 so as to form an annular spring chamber 6 for a coil spring 7. This spring thrusts against the collar 3, and at its forward end thrusts against the flange of the inner sleeve 5. The bore of this sleeve and the interior of the body 2 form a chamber to receive the other coupling member as will presently appear.

The outer end of the body 2 is threaded internally to form a socket to seat the threaded neck of a coupling nut 8; and the inner end of the neck of this nut clamps a soft annular gasket or packing washer 9 upon its annular seat 9a on the body 1.

The outer end of the coupling nut 8 has a threaded neck 10 for connecting this end of the coupling to a pipe end or a hose coupling to deliver any fluid that is carried through this coupling.

The bore of the body portion of the coupling nut forms a chamber for a tapered conical coil spring 11, the small end of which seats against an integral collar 12 on a floating nipple 13 (see Fig. 1) and normally holds the forward side of the collar 12 yieldingly against the gasket 9. The fluid under pressure that is admitted to the coupling from its left end (as indicated by the arrow) squeezes the gasket between the collar 9 and its seat 9a and maintains a fluid tight seal at this point, preventing leakage of the fluid from its supply source, which in the present instance is a reservoir on the towing vehicle, (not illustrated).

The nipple 13 has a tubular shank that floats in the center opening of the gasket and a plurality of ports 14 lead from the bore of the shank through its wall.

When this coupling is telescoped, that is, closed and operating, as illustrated in Figure 3 the end of the tubular mandrel 15 of the other coupling member 16 engages the end of the nipple 13 and shifts it toward the left, at the same time engaging the gasket 9 and pushing its central portion also toward the left. This brings the ports 14 to the left of the gasket and locates them so that they can conduct fluid from the bore of the coupling nut 8, through the coupling. When this is occurring, a fluid tight seal is formed by the fluid pressure exerting its force against the gasket 9, and pressing it against the end of the tubular mandrel 15.

Referring to Figure 2, the mandrel 16 has a collar in the form of a hexagon nut 17, and at the rear side of the nut this coupling member 16 terminates in a threaded sleeve 18 to enable this end of the coupling member to be connected to a pipe line or hose.

The mandrel 15 near its forward end is formed with an annular groove 19 adjacent its tip 20 that is of reduced diameter to enable it to reach the nipple 13 to shift it toward the left as described above. When the coupling members 1 and 16 are telescoped together as shown in Figure 3 this groove 19 seats one or more spring pressed detents or dogs 21 mounted in the wall of the sleeve 2. These detents are disposed so that their axes are inclined, so that their inner end faces 22 are likewise inclined. These faces 22 are engaged by an inclined or beveled end face 23 on the inner end of the sleeve 5. A beveled face 20a is provided on the mandrel 15 that also cooperates with the detents 22.

The two coupling members 1 and 16 described above are no part of my invention, and this fluid coupling is now obtainable on the market. Furthermore, they have correlated form enabling them to seat against each other by a simple telescoping movement, that is to say, without the rotation required if these parts are threaded.

I shall now describe the parts of my invention that transform this fluid coupling into a combined fluid, and electric, coupling, enabling a coupled trailer to be supplied with fluid (compressed air or a hydraulic liquid) for operating the brakes of a towed trailer or semi-trailer; and also supplying electric current from a source of E. M. F. on the towing vehicle for energizing lights or any other electrical accessories on the trailer.

It is understood of course that the pieces composing the two coupling members 1 and 16 are of a material capable of conducting electric current; in other words these parts are of metal which is a good conductor for electric current.

In adapting such a coupling to the purposes of this invention I provide the coupling member 1 with an enveloping casing 24 in the form of a shell with a head 25 at its rear end presenting a tapered or conical guide opening 26 for guiding the forward end of the mandrel, and centering the same to enable it to pass into the chamber or bore 5, and telescope with the other coupling member as indicated in Figure 3.

The casing 24 is provided with an insulating liner 27 with a collar 28 at one end that is countersunk in the conical face of the mouth or guide opening 26. The other end of this liner is closed by an insulating disk 29 having a central opening 30 to fit over a conductive cable-anchor 31 that is in the form of a ring enveloping the threaded neck 10. The anchor ring 31 is in metallic contact with the outer end face of the nut 8.

The anchor ring is of cup-form and fits over the inner end of an insulating sleeve 32 that is internally threaded for attaching the threaded neck 10 to a hose or pipe-end 33 of a supply line from which an operating fluid flows through the coupling.

After the casing shell 24 is slipped over the coupling member 1 the insulating disk 29 is inserted in the bore of the shell, and a spring ring 34 is applied in a circumferential groove to hold it in place.

The other coupling member 16 also carries an insulating sleeve 35 similar to the sleeve 32 which is connected by threads to a delivery hose or pipe-end 36 that is carried by the trailer and delivers the operating fluid to its brakes or any other fluid operated accessory on the trailer.

And an anchor ring 37 similar to the anchor 31 is carried on the insulating sleeve 35 and is in metallic contact with the outer side of the nut 17.

Electric cables 38 and 39 have metallic cable heads or ends 40 that are attached by fastenings or screws 41 to the anchors.

It will be evident that when the coupling is closed, that is, when the two coupling members are telescoped together, electric current can flow through the coupling. The casing 24 is insulated so that it can be safely handled; and of course the pipe-ends 33 and 36 are insulated by their insulating sleeves 32 and 35.

The insulating collar 28 is a precaution to insure that the edges of the nut 17 cannot come into metallic contact with the casing 24.

Many other embodiments of this invention may be resorted to without departing from the spirit of the invention.

I claim as my invention:

1. In a combined pipe, and electric, coupling, the combination of a rigid service pipe-end, and a rigid receiving pipe-end, a conductive service pipe coupling member, a service pipe insulator insulatingly attaching the same to the service pipe-end, an envelope of insulating material enveloping the service pipe coupling and co-operating with the service pipe insulation to completely insulate the service pipe coupling, a second, conductive receiving pipe coupling member, a receiving pipe insulator for insulatingly attaching the same to the receiving pipe-end, a conductor cable having a cable anchor mounted on said receiving pipe insulation and in metallic contact with the receiving coupling member, and a second conductive cable having a cable anchor mounted on the service pipe coupling member and in metallic contact therewith, said pipe coupling members having correlated means for mechanically holding the same coupled to each other and functioning to conduct the current of the circuit established by their contact with each other.

2. A combined pipe, and electric, coupling, according to claim 1 in which one of said cable-anchors comprises an annulus encircling one of said insulators.

3. A combined pipe, and electric, coupling, according to claim 1 in which each of said cable-anchors comprises an annulus encircling its corresponding insulator.

4. A combined pipe, and electric, coupling, according to claim 1 in which each of said cable-anchors comprises an annulus encircling its corresponding insulator, with fastening means passing through each cable end and seated in the insulator.

5. In a combined pipe, and electric, coupling, for connecting a rigid service pipe-end to a rigid receiving pipe-end, the combination of an insulator capable of encircling, and attachment to the service pipe-end, an electric conductive pipe coupling member carrying the said insulator, a second insulator capable of encircling, and attachment to the receiving pipe-end, a second electric conductive coupling member, said coupling members having correlated form enabling the second named coupling member to seat against the other coupling member by a telescoping movement, said second coupling member carrying said second insulator, and electric cable-anchors carried respectively on said insulators and in contact respectively with said insulated coupling members operating to conduct the current, and said insulated coupling members operating to conduct the current and cooperating with said cable-anchors to close an electric circuit through the coupling.

6. A combined pipe, and electric, coupling, according to claim 5 including a casing enveloping one of said coupling members and having means at one end thereof for guiding the coupling members into their telescoping relation.

7. A combined pipe, and electric, coupling, according to claim 5 in which one of said coupling members has a chamber to receive the other coupling member by a telescoping movement, and including an insulated shell form casing enveloping the chambered coupling member, and having guiding means at one end thereof for guiding the coupling members into their telescoping relation.

8. In a combined pipe, and electric, coupling, the combination of an externally threaded rigid service pipe-end, and an externally threaded rigid receiving pipe-end, a pipe coupling member capable of conducting electric current, a sleeve-form insulator attached on the threads of the service pipe-ends, insulatingly attaching the same to the service pipe-end, a second conductive pipe coupling member, a second sleeve-form insulator attached on the threads of the receiving pipe-end for insulatingly attaching the same to the receiving pipe-end, a conductive cable having a cable-anchor mounted on one of said insulators and in metallic contact with one of said coupling members, and a second conductive cable having a cable-anchor mounted on the other of said insulators and in metallic contact with the other coupling member, said pipe coupling members having a correlated form for mechanically holding the same coupled to each other, and functioning to conduct the current of the circuit established by their contact with each other.

9. In a combined pipe, and electric, coupling, the combination of a rigid service pipe-end and a rigid receiving pipe-end, a tubular conductive pipe coupling member operating as a passage for a fluid, and for conducting an electric current, an insulator insulatingly attaching the coupling member to the service pipe-end; a second tubular conductive coupling member operating as a passage for a fluid, and for conducting an electric current, a second insulator for insulatingly attaching the same to the receiving pipe-end; said coupling members having a correlated form enabling the same to telescope and couple themselves together when said pipe-ends approach each other in axial alignment, so as to form a passage for conducting fluid from the service pipe to the receiving pipe; a conductive cable connected to one of said coupling members for conducting current thereto, and a second conductive cable connected to the second pipe coupling member, said conductive coupling members operating when coupled together to close a circuit through said cables.

10. In a combined pipe, and electric, coupling, the combination of a rigid service pipe-end, and a rigid receiving pipe-end, a conductive service pipe coupling member, a service pipe insulator sleeve attached at one end over the service pipe-end and attached at its other end to the service pipe coupling member for insulatingly attaching the same to the service pipe-end, an envelope of insulating material enveloping the service pipe coupling and cooperating with the service pipe insulation sleeve to completely insulate the service pipe coupling, a second, conductive receiving pipe coupling member, a receiving pipe insulator sleeve attached at one end over the receiving pipe coupling, and attached at its other end to the service pipe-end for insulatingly attaching the same to the receiving pipe-end, a conductor cable having a cable anchor mounted on said receiving pipe insulation and in metallic contact with the receiving coupling member, and a second conductive cable having a cable anchor mounted on the service pipe coupling member and in metallic contact therewith, said pipe coupling members having correlated means for mechanically holding the same coupled to each other and functioning to conduct the current of the circuit established by their contact with each other.

AMOS H. KIRKSEY.

REFERENCES CITED

The following references are of record in the file of this patent:

UNITED STATES PATENTS

| Number | Name | Date |
| --- | --- | --- |
| 696,702 | Weitz | Apr. 1, 1902 |
| 910,040 | Bliss | Jan. 19, 1909 |
| 1,230,213 | Pieper | June 19, 1917 |
| 2,318,648 | Penfold | May 11, 1943 |
| 2,389,895 | Colley et al. | Nov. 27, 1945 |